United States Patent
Ohashi (10) Patent No.: US 8,774,486 B2
(45) Date of Patent: Jul. 8, 2014

(54) IMAGE PROCESSING APPARATUS, IMAGE PROCESSING METHOD, AND PROGRAM

(75) Inventor: Takeshi Ohashi, Tokyo (JP)

(73) Assignees: Sony Corporation, Tokyo (JP); Japanese Foundation for Cancer Research, Tokyo (JP)

(*) Notice: Subject to any disclaimer, the term of this patent is extended or adjusted under 35 U.S.C. 154(b) by 445 days.

(21) Appl. No.: 13/046,918

(22) Filed: Mar. 14, 2011

(65) Prior Publication Data

US 2011/0243405 A1 Oct. 6, 2011

(30) Foreign Application Priority Data

Apr. 1, 2010 (JP) ................................. 2010-084755

(51) Int. Cl.
*G06K 9/00* (2006.01)
(52) U.S. Cl.
USPC ........... 382/133; 382/128; 382/224; 382/225; 382/226; 382/227; 382/228; 600/921
(58) Field of Classification Search
USPC ................. 382/128, 133, 224–228, 131, 190; 600/921
See application file for complete search history.

(56) References Cited

U.S. PATENT DOCUMENTS

| | | | | |
|---|---|---|---|---|
| 7,720,272 | B2* | 5/2010 | Armogida | 382/133 |
| 8,098,956 | B2* | 1/2012 | Tatke et al. | 382/284 |
| 2004/0202359 | A1* | 10/2004 | Muller et al. | 382/131 |
| 2006/0098858 | A1* | 5/2006 | Guittet | 382/133 |
| 2007/0269085 | A1 | 11/2007 | Oshiro et al. | |
| 2009/0074270 | A1* | 3/2009 | Tanaka et al. | 382/128 |
| 2009/0190812 | A1 | 7/2009 | Sano et al. | |
| 2009/0213214 | A1 | 8/2009 | Yamada | |
| 2010/0061617 | A1* | 3/2010 | Ingermanson et al. | 382/133 |
| 2010/0098306 | A1* | 4/2010 | Madabhushi et al. | 382/128 |

FOREIGN PATENT DOCUMENTS

| | | |
|---|---|---|
| JP | 2006-506635 | 2/2006 |
| JP | 2007-307358 | 11/2007 |
| JP | 2007-310231 | 11/2007 |
| JP | 2008-309685 | 12/2008 |
| JP | 2009-175040 | 8/2009 |
| JP | 2009-175334 | 8/2009 |
| WO | 2008-007725 | 1/2008 |

OTHER PUBLICATIONS

Office Action issued on Nov. 7, 2013 in Japanese Application No. 2010-084755.

* cited by examiner

*Primary Examiner* — Matthew Bella
*Assistant Examiner* — Julian Brooks
(74) *Attorney, Agent, or Firm* — Oblon, Spivak, McClelland, Maier & Neustadt, L.L.P.

(57) ABSTRACT

There is provided an image processing apparatus that analyzes a pathology image obtained by imaging an analysis object including a setting device for calculating an amount of a luminance difference characteristic as an amount of characteristic of each pixel of a pathology image, and for setting a cellular tissue region in the pathology image, based on the amount of the luminance difference characteristic, using a cellular tissue detector that has studied in advance. The cellular tissue detector may have studied in advance by statistical learning that uses an image corresponding to a cellular tissue.

15 Claims, 8 Drawing Sheets

CELLULAR TISSUE REGION A

D

CELLULAR TISSUE REGION B

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, particularly it relates to an image processing apparatus, an image processing method, and a program suitable for using for detecting a focal site such as tumors on a pathology image obtained by taking tomography of a human body, for example.

2. Description of the Related Art

In the past, there exists an image-recognition technique to detect the focal site such as a tumor on the pathology image obtained by imaging the organ or the like of the human body.

For instance, JP 2009-175040A discloses a technique for analyzing a noteworthy region (ROI) imaging the ROI again by the high magnification after providing the ROI on the pathology image by a person (a pathology medicine). In the analysis, edge information within the ROI is used as an amount of image characteristics.

Moreover, JP 2007-310231A discloses a technique for scrutinizing a site that should be analyzed by using the dark-field macroscope after staining the site by using samples of fluorescent dye.

JP 2009-175334A discloses a technique for excluding a white region in the pathology image as a background (region not to be noted).

SUMMARY OF THE INVENTION

As described above, it has been done in the past to provide a noteworthy region on the pathology image, and to exclude a region not to be noted, in the image recognition for detecting a focal site on a pathology image.

However, it is difficult to set the noteworthy region on the pathology image adequately by easy processing.

In light of the foregoing, it is desirable to provide a technique to detect adequately a noteworthy cellular tissue region on the pathology image by easy processing.

According to an embodiment of the present invention, there is provided an image processing apparatus that analyzes a pathology image obtained by imaging an analysis object including a setting device for calculating an amount of a luminance difference characteristic as an amount of characteristic of each pixel of a pathology image, and for setting a cellular tissue region in the pathology image, based on the amount of the luminance difference characteristic, using a cellular tissue detector that has studied in advance. The cellular tissue detector may have studied in advance by statistical learning that uses an image corresponding to a cellular tissue.

The setting device may include an amount of characteristic calculation device for calculating an amount of a luminance difference characteristic as an amount of characteristic of each pixel of a pathology image, and a detecting device for detecting a cellular tissue region in the pathology image, based on the amount of the luminance difference characteristic, using a cellular tissue detector that has studied in advance, a determining device for determining the cellular tissue region to be a principal among a plurality of cellular tissue regions that exist in the pathology image based on a size of the detected cellular tissue region, a score in the cellular tissue detector, and a position in the pathology image, and a rectangular region decision device for determining a rectangular region inscribed by the cellular tissue region determined to be a principal.

The image processing apparatus may further include an analysis device for analyzing a pathology image corresponding to the cellular tissue region that has been set, and for detecting a focal site.

The image processing apparatus may further include an imaging device for imaging an analysis object to generate the pathology image.

The amount of characteristic calculating device may calculate an amount of a luminance difference characteristic as an amount of characteristic of each pixel of a pathology image in a low resolution imaged at a low resolution by the imaging device, the imaging device may image the analysis object again at a high resolution based on the rectangular region determined, and the analysis device may analyze a high-resolution pathology image that has been imaged at a high resolution again by the imaging device, and detects a focal site.

The statistical learning may be Boosting.

According to another embodiment of the present invention, there is provided an imaging processing method including an image processing apparatus for analyzing a focal site obtained by imaging an analysis object including the steps of calculating an amount of a luminance difference characteristic as an amount of characteristic of each pixel of a pathology image, and setting a cellular tissue region in the pathology image, by the imaging processing apparatus based on the amount of the luminance difference characteristic, using a cellular tissue detector that has studied in advance. The cellular tissue detector may have studied in advance by statistical learning that uses an image corresponding to a cellular tissue.

According to another embodiment of the present invention, there is provided a program for causing a computer for analyzing a pathology image obtained by imaging an analysis object to function as a setting device for calculating an amount of a luminance difference characteristic as an amount of characteristic of each pixel of a pathology image, and for setting a cellular tissue region in the pathology image, based on the amount of the luminance difference characteristic, using a cellular tissue detector that has studied in advance. The cellular tissue detector may have studied in advance by statistical learning that uses an image corresponding to a cellular tissue.

According to the embodiments of the present invention, it becomes possible to calculate an amount of a luminance difference characteristic as an amount of characteristic of each pixel of a pathology image, and to set a cellular tissue region in the pathology image, based on the amount of the luminance difference characteristic, using a cellular tissue detector that has studied in advance.

According to another embodiment of the present invention, it is possible to detect adequately the noteworthy cellular tissue region to be noted on the pathology image.

Moreover, according to another embodiment of the present invention, it is possible to detect the focal site immediately by scrutinizing the detected cellular tissue region only.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. Embodiment

Configuration Example of Focal Site Detection Device

Figure 1:
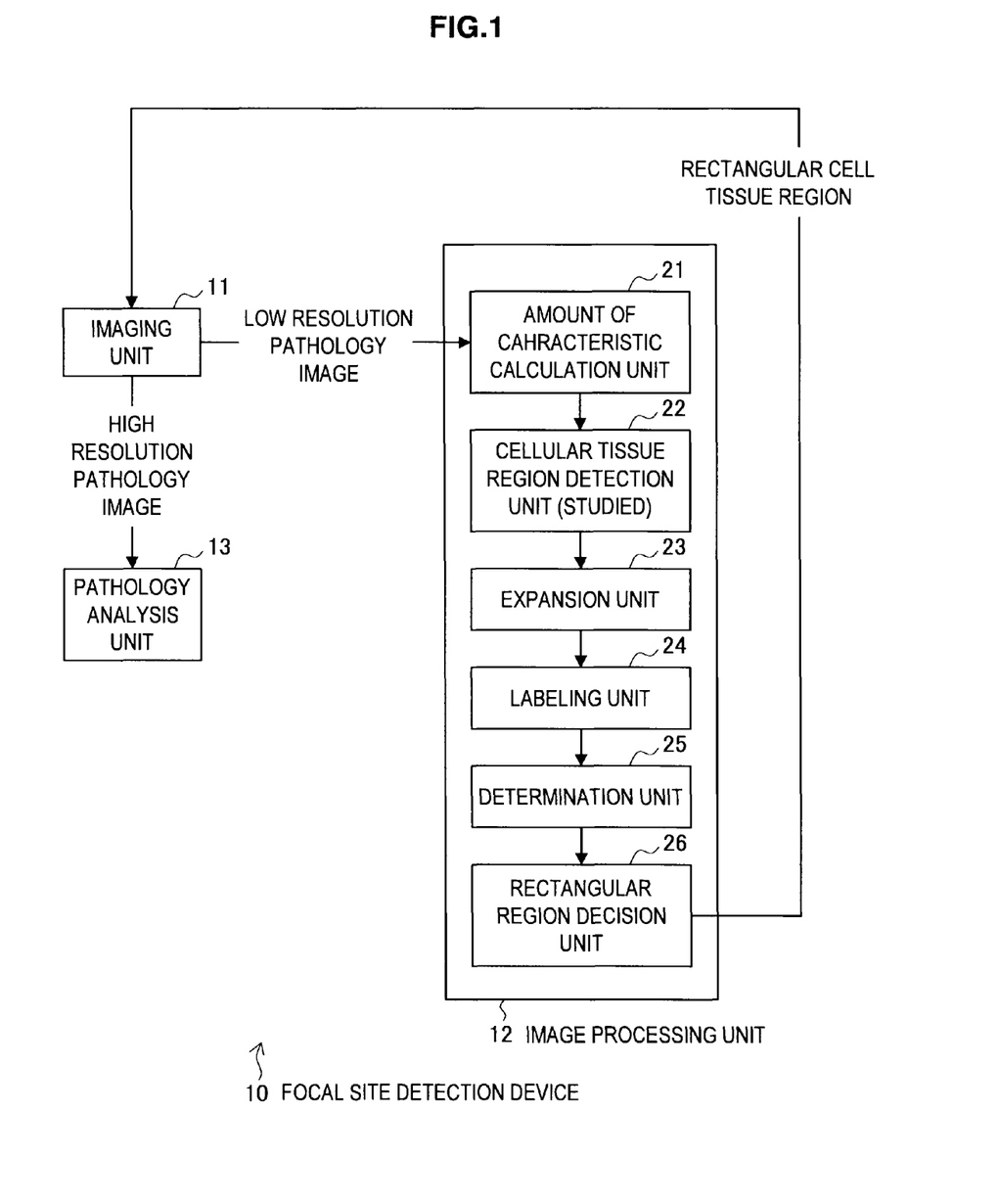
FIG. 1 is a block diagram showing a configuration example of a focal site detection device according to the present invention.

A focal site detection device 10 includes an imaging unit 11, an image processing unit 12, and a pathology analysis unit 13.

The imaging unit 11 images the whole of a prepared slide of the analysis object (for instance, organ slice or the like of the human body) at a low resolution, and outputs its low resolution pathology image obtained as a result of imaging to the image processing unit 12. Note that since the low resolution image uses only the luminance of each pixel, it may be possible to image in black and white.

Moreover, the imaging unit 11 images only a rectangular cellular tissue region in the low resolution pathology image notified from the image processing unit 12 at a high resolution, and outputs a high resolution pathology image obtained as a result of imaging to the pathology analysis unit 13.

The image processing unit 12 separates the low resolution pathology image to be input from the imaging unit 11 into a noteworthy cellular tissue region to be noted and a background region to be excluded (region that is not cellular tissues), specifies a rectangular region (rectangular cellular tissue region) that inscribes the cellular tissue region, and notifies the imaging unit 11 of its coordinates position.

The pathology analysis unit 13 analyzes the high resolution pathology image of the rectangular cellular tissue region to be input from the imaging unit 11, and detects the focal site such as the tumors. Note that it is arbitrary how the pathology analysis unit 13 detects the focal site. For instance, the pathology analysis unit 13 studies the amount of image characteristics of the tumor site in advance to make a data base, and detects the focal site by comparing with the amount of image characteristics at each position in the high resolution pathology image.

Thus, the computing cost can be reduced and the time necessary for a series of processing can be shortened comparing with the case where the whole of the analysis object is imaged at a high resolution to be analyzed, by analyzing the high resolution pathology image of a rectangular cellular tissue region in the pathology analysis unit 13.

Next, an explanation will be given on the image processing unit 12. The image processing unit 12 includes an amount of characteristic calculation unit 21, a cellular tissue region detection unit 22, an expansion unit 23, a labeling unit 24, a determination unit 25, and a rectangular region decision unit 26.

The amount of characteristic calculation unit 21 designates each pixel of the low resolution pathology image to be input from the imaging unit 11 for a noteworthy pixel sequentially, and sets pixel block in a prescribed size (for instance, 5*5 pixels) that centers on the noteworthy pixel. Subsequently, an amount of the luminance difference characteristic is calculated as an amount of characteristic of the noteworthy pixel on the basis of its pixel block. The amount of characteristic calculation unit 21 outputs the amount of the luminance difference characteristic calculated with respect to the low resolution pathology image and its each pixel to the cellular tissue region detection unit 22.

Here, the amount of the luminance difference characteristic is configured to note a plurality of pair of pixels prescribed within a pixel block, and to calculate difference in each luminance of the pair of pixels. It is assumed that the position of the pixel that configures the pair of pixels is determined by a statistical studying technique, Boosting, based on the amount of the luminance difference characteristic calculated with respect to the low resolution pathology image (image of the cellular tissue) that has been studied.

Note that the amount of the luminance difference characteristic may sometimes be called PixDif, which is disclosed in detail, for example, in JP 2005-284348A, or the like. Moreover, the amount of Haar-like characteristic may be adopted as the amount of characteristic. The Haar-like characteristic is well known as "Paul Viola and Michel J. Jones: "Rapid Object Detection Using a Boosted Cascade of Simple Features", Proceedings of the 2001 IEEE Computer Society Conference on Computer Vision and Pattern Recognition".

The cellular tissue region detection unit 22 has a built-in cellular tissue region detector that has studied, and sections the low resolution pathology image into the cellular tissue region and the rest of it on the basis of the amount of the luminance difference characteristic of each pixel of the low resolution pathology image to be input from the amount of characteristic calculation unit 21. Note that there is a possibility that the sections here are based on the amount of the luminance difference characteristic, and that the vicinity of its boundary may not be necessarily sectioned accurately. The cellular tissue region detection unit 22 outputs a processing result (including a score showing the similarity with the study result) to the expansion unit 23 in the subsequent stage.

The expansion unit 23 performs the expansion processing for the region sectioned as the cellular tissue region in the low resolution pathology image to make its outline expanded minutely. As a result, the region that has been sectioned as the rest of the cellular tissue although it was actually a cellular tissue can be prevented to be left behind. The expansion unit 23 outputs the result of the processing to the labeling unit 24.

The labeling unit 24 performs region labeling processing for providing a different label to each cellular tissue region (done with the expansion processing) scattered on the low resolution pathology image. For instance, when two cellular tissue regions exist in the low resolution pathology image, the labeling processing is performed so that there is a cellular tissue region A on one side while there is a cellular tissue region B on the other side. The expansion processing and the region labeling processing mentioned above are well-known technologies in the art of image processing (for instance, see "Digital Image Processing", supervised by Digital Image Processing Editing Committee, the 2nd edition, Computer Graphic Arts Society). The labeling unit 24 outputs the result of the processing to the determination unit 25.

The determination unit 25 calculates a principal degree score SA for each cellular tissue region, for which the label in the low resolution pathology image is provided, on the basis of the size of the region, the score in the cellular tissue region detection unit 22 (score showing the similarity with the study result), and the score based on the position in the low resolution pathology image. Then each cellular tissue region is determined to either of the principal or the secondary on the basis of the principal degree score SA. The determination unit 25 outputs the result of the processing to the rectangular region decision unit 26.

The rectangular region decision unit 26 sets the rectangular region (rectangular cellular tissue region) so to be inscribed by the cellular tissue region determined to be the principal in the low resolution pathology image, and notifies the imaging unit 11 of its coordinates position.

[Operation Explanation]

Figure 2:
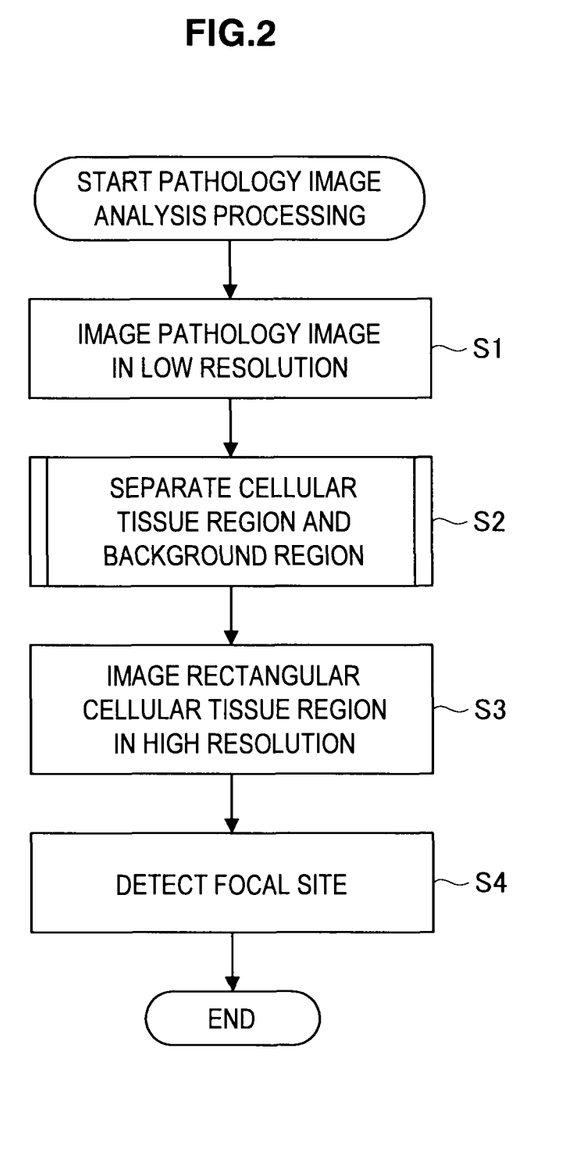
FIG. 2 is a flow chart explaining pathology image analysis processing.

Next, an operation of the focal site detection device 10 will be explained. FIG. 2 is a flow chart explaining pathology image analysis processing by a focal site detection device 10.

In step S1, the imaging unit 11 images the whole of a prepared slide of the analysis object at a low resolution, and outputs the low resolution pathology image obtained as a result of the imaging to the image processing unit 12.

In step S2, the image processing unit 12 separates the low resolution pathology image to be input from the imaging unit 11 into a cellular tissue region and a background region, and specifies a rectangle cellular tissue region that inscribes the cellular tissue region, and notifies the imaging unit 11 of its coordinates position.

Figure 3:
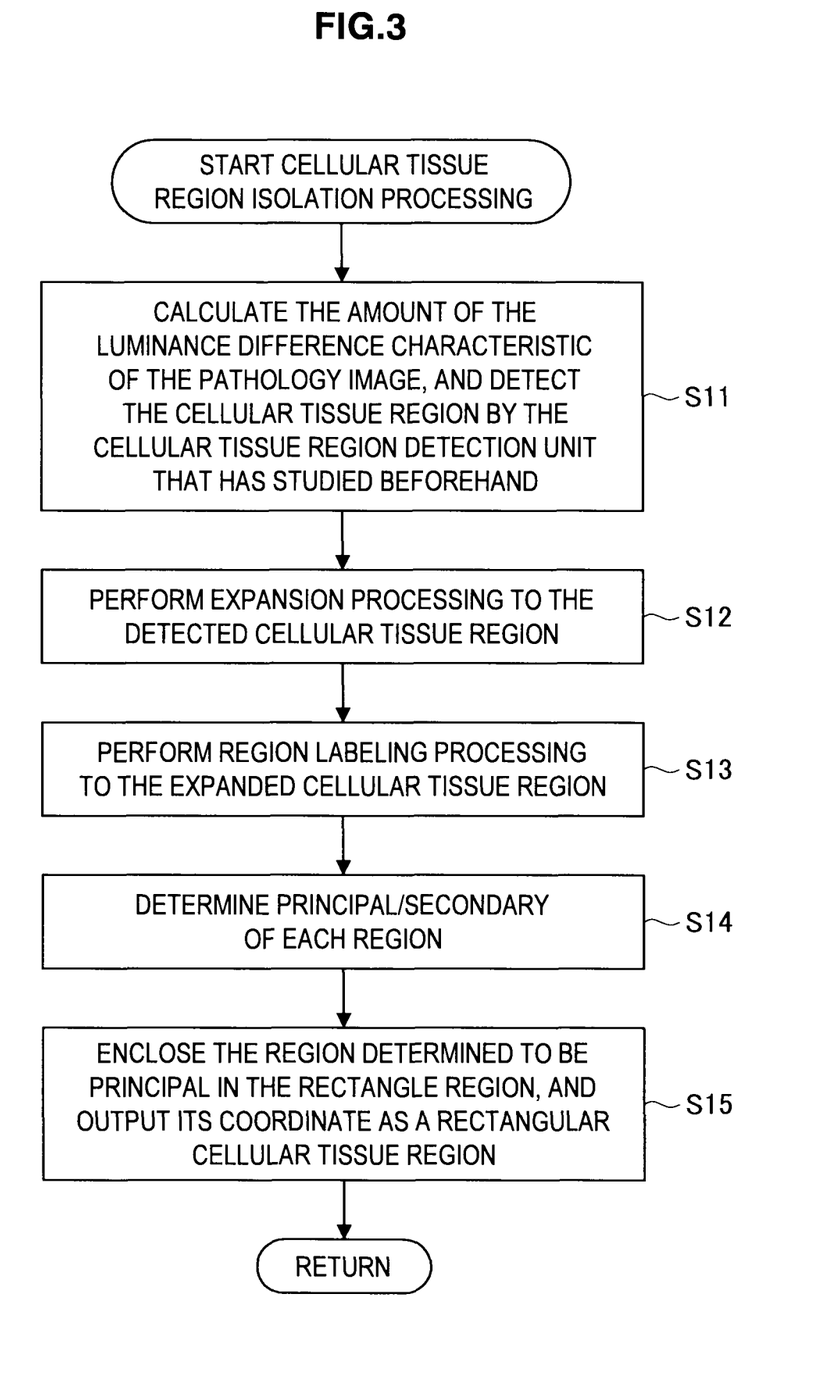
FIG. 3 is a flow chart explaining cellular tissue region isolation processing.
Figure 4:
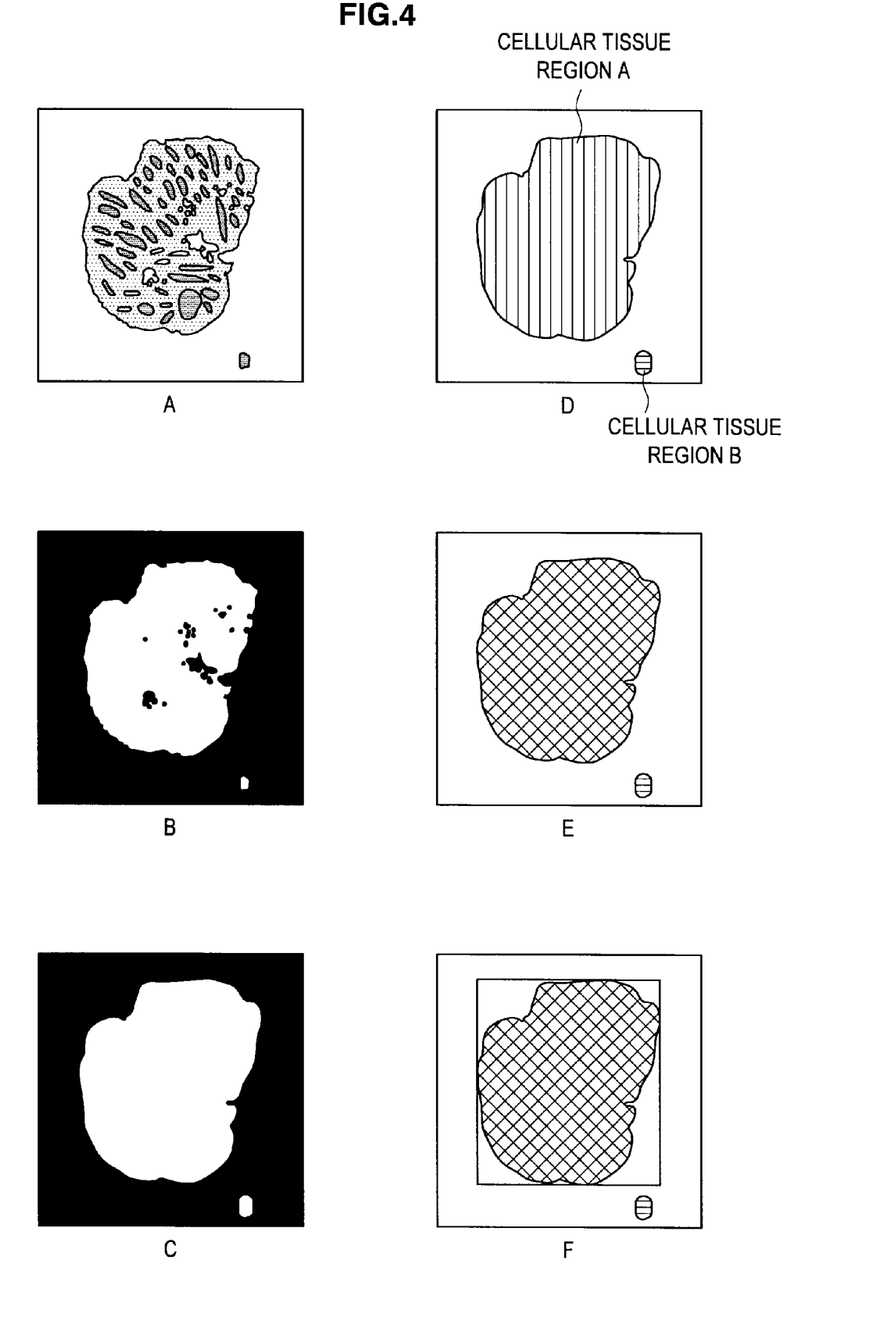
FIG. 4 is a diagram showing an example of a low resolution pathology image.

Here, step S2 processing (hereinafter, referred to as cellular tissue region isolation processing) is explained in detail referring to FIG. 3 and FIG. 4. FIG. 3 is a flow chart explaining cellular tissue region isolation processing. FIG. 4 shows low resolution pathology images processed in each step of the cellular tissue region isolation processing.

In the image processing unit 12, the low resolution pathology image input from the imaging unit 11 is input to the amount of characteristic calculation unit 21. The low resolution pathology image input from the imaging unit 11 is as shown in FIG. 4A for instance.

In step S11, the amount of characteristic calculation unit 21 specifies each pixel of the low resolution pathology image input from the imaging unit 11 for a noteworthy pixel sequentially, and sets pixel block of a prescribed size that centers on a noteworthy pixel. Subsequently, an amount of the luminance difference characteristic is calculated as an amount of characteristic of the noteworthy pixel on the basis of its pixel block. The amount of characteristic calculation unit 21 outputs the amount of the luminance difference characteristic calculated with respect to the low resolution pathology image and its each pixel to the cellular tissue region detection unit 22. The cellular tissue region detection unit 22 sections the low resolution pathology image dividing into the cellular tissue region and the rest of it, and outputs the low resolution pathology image, wherein, as shown in FIG. 4B, for example, the cellular tissue region is shown in white while the rest of the area is shown in black, to the expansion unit 23.

In step S12, the expansion unit 23 performs an expansion processing for the region sectioned as the cellular tissue region in the low resolution pathology image, and outputs the low resolution pathology image obtained as a result of the processing, in which the outline of the cellular tissue region has been expanded minutely as shown FIG. 4C, for example, to the labeling unit 24.

In step S13, the labeling unit 24 performs region labeling processing for providing a different label to each cellular tissue region (done with the expansion processing) scattered on the low resolution pathology image. As a result, as shown in FIG. 4D, for instance, if there are two cellular tissue regions existed in the low resolution pathology image, a labeling such as the cellular tissue region A is provided for one side while a labeling such as the cellular tissue region B is provided for the other side. The labeling unit 24 outputs the result of the processing to the determination unit 25.

In step S14, the determination unit 25 calculates the principal degree score SA for each cellular tissue region, for which the label in the low resolution pathology image is provided, on the basis of the size of the region, the score (score showing the similarity with the study result) SDi in the cellular tissue region detection unit 22, and the score SPi based on the position in the low resolution pathology image, using the following formula (1).

$$SA = \Sigma(SDi \times SPi) \tag{1}$$

Here, $\Sigma$ here means the sum total of pixel i that belongs to each cellular tissue region.

Figure 5:
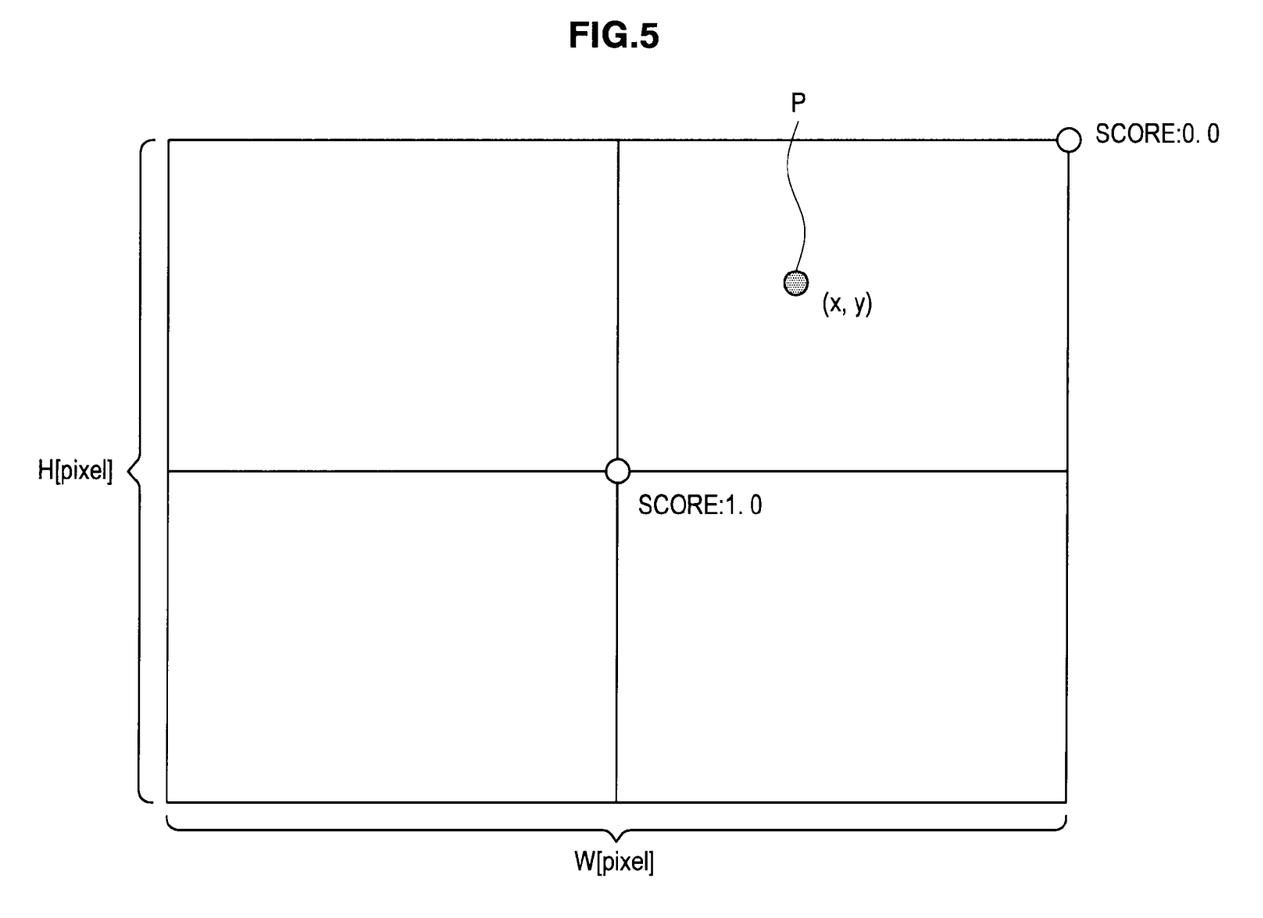
FIG. 5 is a diagram explaining how a score SPi is calculated based on a position in the low resolution pathology image.

Moreover, regarding the score SPi based on the position in the low resolution pathology image, the value calculated by using the following formula (2) is adopted for the position relationship shown in FIG. 5 so that the score becomes larger as it is closer to the center of the screen while the score becomes smaller as it is closer to the surrounding.

$$SP = 1 - SQR[((x/W) - 0.5)^2 \times 2 + ((y/H) - 0.5)^2 \times 2] \tag{2}$$

In addition, the determination unit 25 determines each cellular tissue region as either of the principal or the secondary on the basis of the principal degree score SA. This determination determines the cellular tissue region whose principal degree score SA exceeds the prescribed threshold value as the principal, for instance, and determines others as the secondary. Or, a predetermined number (1, for instance) of the cellular tissue regions are to be sequentially determined as the principal from the one with a larger principal degree score SA, and others are to be determined as the secondary.

In the example of FIG. 4, the largest cellular tissue region in the center of the screen is to be determined as the principal as shown in FIG. 4E. The determination unit 25 outputs the result of the processing to the rectangular region decision unit 26.

In step S15, the rectangular region decision unit 26 sets the rectangular region (rectangular cellular tissue region) so to be inscribed by the cellular tissue region determined to be the principal in the low resolution pathology image, and notifies the imaging unit 11 of its coordinates position. Hence, the cellular tissue region isolation processing is ended, and processing is returned to step S3 in FIG. 2.

In step S3, based on a coordinates of rectangular cellular tissue region notified from the image processing unit 12, the imaging unit 11 images only a rectangular cellular tissue region among prepared slide of analysis objects at a high resolution, and outputs the high resolution pathology image obtained as a result of the imaging to the pathology analysis unit 13.

In step S4, the pathology analysis unit 13 analyzes the high resolution pathology image input from the imaging unit 11, and detects the focal site such as the tumors. Hence, the pathology image analysis processing is ended.

According to this pathology image analysis processing, it is possible to reduce the computing cost and time taking for a series of processing comparing to a case where the whole of the analysis object is imaged at a high resolution to be analyzed.

Other Application Examples

Figure 6:
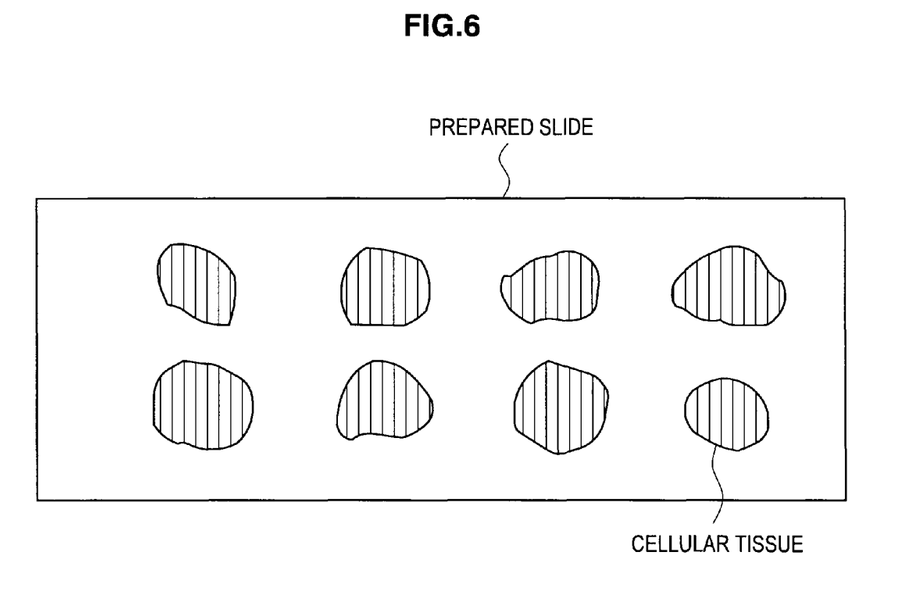
FIG. 6 is a diagram showing an example of a prepared slide on which a plurality of analysis objects are arranged.

According to the present invention, it is possible to be applied to the preprocessing when to scan the prepared slide on which the plurality of analysis objects (cellular tissues) shown in FIG. 6 for instance are arranged.

Figure 7A:
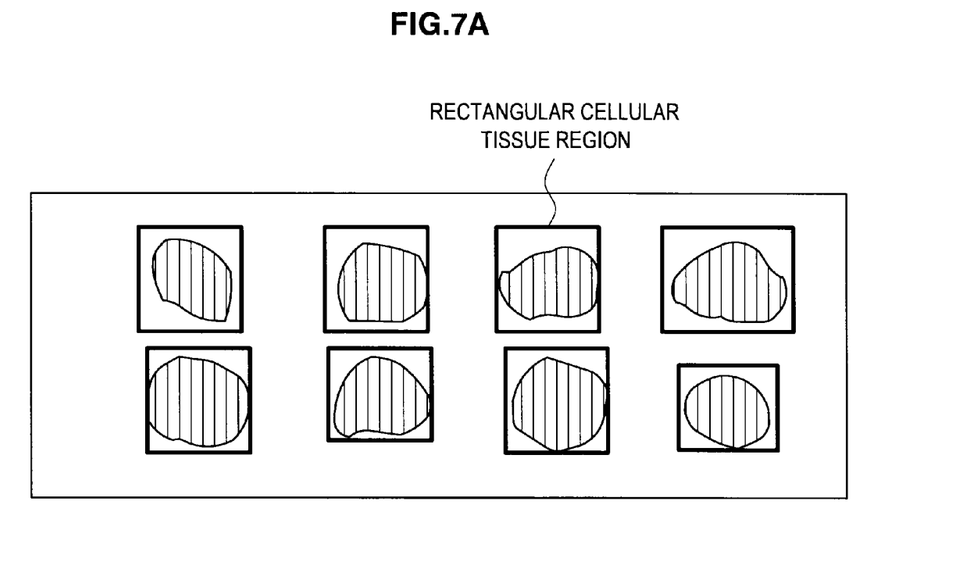
FIG. 7 is a diagram showing a rectangular cellular tissue region corresponding to FIG. 6.
Figure 7B:
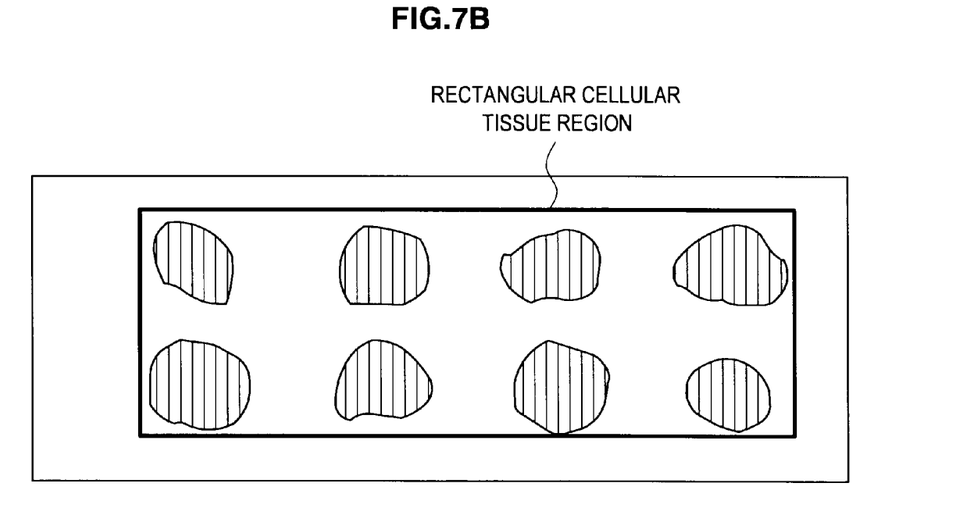

That is, in the past, the scanning object was the whole area of the prepared slide like the one shown in this figure, or a prescribed region set by hand. By applying the invention in this application, however, it becomes possible to set a rectangular cellular tissue region individually to each of the analysis objects on the prepared slide as shown in FIG. 7A, and to set a rectangular cellular tissue region so as to inscribe all analysis objects on the prepared slide as shown in FIG. 7B. Therefore, it is possible to minimize the region of the object to be scanned, and to shorten the time required for it.

A series of processing described above may be executed by hardware, or by software. When to execute the series of processing by software, a program that configures to include the software can be installed from a recording medium of the program into a computer built in a dedicated hardware or a personal computer for general purpose, for example, which can execute various functions by installing various programs.

Figure 8:
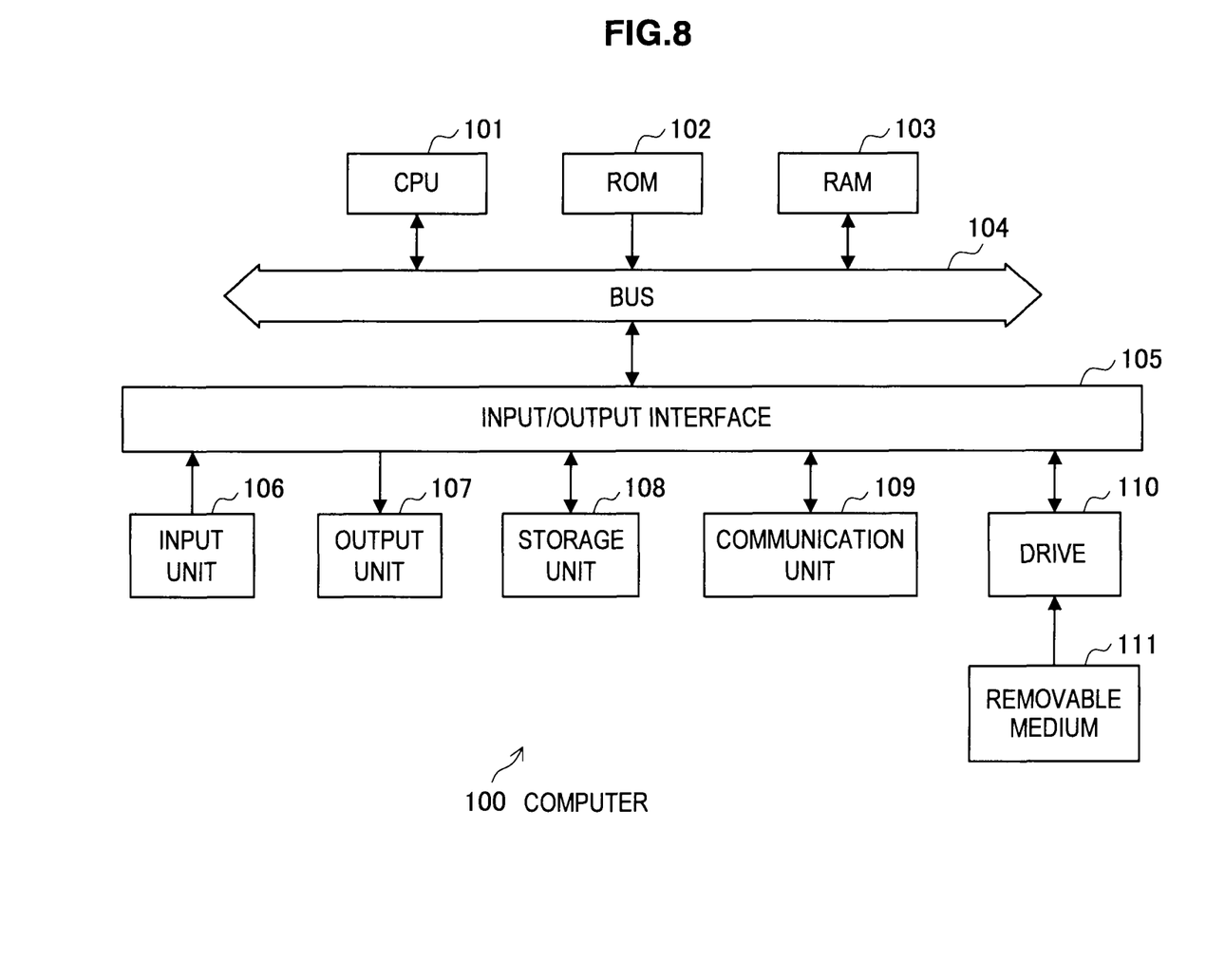
FIG. 8 is a block diagram showing a configuration example of a computer.

FIG. 8 is a block diagram showing a configuration example of computer hardware performed by the program that executes the above-mentioned series of processing.

A CPU (Central Processing Unit) 101, a ROM (Read Only Memory) 102, and a RAM (Random Access Memory) 103 are connected mutually by a bus 104 in this computer 100.

The bus 104 is further connected with an input/output interface 105. The input/output interface 105 is connected with an input unit 106 having a keyboard, a mouse, and a microphone or the like, an output unit 107 having a display, a speaker or the like, a storage unit 108 having hardware, a nonvolatile memory or the like, a communication unit 109 having a network interface or the like, a drive 110 that operates a removable media 111 such as a magnetic disk, an optical disc, a Magneto Optical disk or a semiconductor memory, or the like.

On a computer 200 configured as mentioned above, a CPU 201 performs the series of processing described above by loading the program stored in a storage unit 208, for example, into a RAM 203 via an input/output interface 205 and a bus 204 to execute.

Note that a program executed by a computer may be a program executing processing in the order described in the present specification in chronological order, or may be a program executing processing in parallel, or at a necessary timing, such as when there is a call, or the like.

Moreover, the program may be processed by one computer, or may be processed by a plurality of computers in the distributed processing. Moreover, the program may be transferred to the computer in the distance to be executed.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-084755 filed in the Japan Patent Office on Apr. 1, 2010, the entire content of which is hereby incorporated by reference.

What is claimed is:

1. An image processing apparatus that analyzes a pathology image obtained by imaging an analysis object comprising:
   circuitry configured to:
      calculate an amount of a luminance difference characteristic as an amount of characteristic of each pixel of a pathology image, and set a cellular tissue region in the pathology image, based on the amount of the luminance difference characteristic, using a cellular tissue detector that has studied an image corresponding to a cellular tissue in advance, wherein the cellular tissue detector has studied the image in advance by statistical learning;
      determine the cellular tissue region to be a principal among a plurality of cellular tissue regions that exist in the pathology image based on at least a position of the cellular tissue region in the pathology image relative to a center of the pathology image; and
      calculate a principal degree score based on at least the position of the cellular tissue region,
   wherein the principal degree score increases as the position of the cellular tissue region is closer to the center of the pathology image.

2. The image processing apparatus according to claim 1 wherein the circuitry is configured to:
   calculate an amount of a luminance difference characteristic as an amount of characteristic of each pixel of a pathology image, and detect a cellular tissue region in the pathology image, based on the amount of the luminance difference characteristic, using the cellular tissue detector; and
   determine a rectangular region inscribed by the cellular tissue region determined to be the principal.

3. The image processing apparatus according to claim 2 wherein the circuitry is configured to analyze a pathology image corresponding to the cellular tissue region that has been set, and for detecting a focal site.

4. The image processing apparatus according to claim 2 further comprising an image capturing device configured to capture an analysis object to generate the pathology image.

5. The image processing apparatus according to claim 4, wherein
   the circuitry is configured to calculate an amount of a luminance difference characteristic as an amount of characteristic of each pixel of a pathology image in a low resolution imaged at a low resolution by the image capturing device,
   the image capturing device is configured to capture the analysis object again at a high resolution based on the rectangular region determined, and
   the circuitry is configured to analyze a high-resolution pathology image that has been imaged at a high resolution again by the image capturing device, and detects a focal site.

6. The image processing apparatus according to claim 2, wherein the statistical learning is Boosting.

7. An imaging processing method of an image processing apparatus for analyzing a focal site obtained by imaging an analysis object comprising the steps of:
   calculating, by the imaging processing apparatus, an amount of a luminance difference characteristic as an amount of characteristic of each pixel of a pathology image, and setting a cellular tissue region in the pathology image, based on the amount of the luminance difference characteristic, using a cellular tissue detector that has studied an image corresponding to a cellular tissue in advance;

determining the cellular tissue region to be a principal among a plurality of cellular tissue regions that exist in the pathology image based on at least a position of the cellular tissue region in the pathology image relative to a center of the pathology image; and calculating a principal degree score based on at least the position of the cellular tissue region, wherein the cellular tissue detector has studied the image in advance by statistical learning, and wherein the principal degree score increases as the position of the cellular tissue region is closer to the center of the pathology image.

8. A non-transitory medium storing a program which when executed causes a computer for analyzing a pathology image obtained by imaging an analysis object to function as:

a setting device configured to calculate an amount of a luminance difference characteristic as an amount of characteristic of each pixel of a pathology image, and for setting a cellular tissue region in the pathology image, based on the amount of the luminance difference characteristic, using a cellular tissue detector that has studied an image corresponding to a cellular tissue in advance, wherein the cellular tissue detector has studied the image in advance by statistical learning, the setting device includes a determining device configured to determine the cellular tissue region to be a principal among a plurality of cellular tissue regions that exist in the pathology image based on at least a position of the cellular tissue region in the pathology image relative to a center of the pathology image, the setting device is further configured to calculate a principal degree score based on at least the position of the cellular tissue region, and the principal degree score increases as the position of the cellular tissue region is closer to the center of the pathology image.

9. The image processing apparatus according to claim 1, wherein the circuitry is configured to determine the cellular tissue region to be a principal among a plurality of cellular tissue regions that exist in the pathology image based on a size of the detected cellular tissue region.

10. The image processing apparatus according to claim 9, wherein the circuitry is configured to determine the cellular tissue region to be a principal among a plurality of cellular tissue regions that exist in the pathology image based on a score in the cellular tissue detector.

11. The image processing apparatus according to claim 10, wherein the circuitry is configured to calculate the principal degree score based on the size of the detected cellular tissue region and the score in the cellular tissue detector.

12. The image processing apparatus according to claim 1, wherein the circuitry is configured to determine the cellular region to be the principal based upon the principal degree score.

13. The image processing apparatus according to claim 12, wherein the circuitry is configured to determine the cellular region to be the principal when the principal degree score is greater than a threshold.

14. The image processing apparatus according to claim 12, wherein a predetermined number of cellular tissue regions each having a principal degree score greater than the others are sequentially determined as the principal.

15. The image processing apparatus according to claim 5, wherein the image capturing device is configured to capture the analysis object again at the high resolution based upon coordinates of a rectangular region determined in the low resolution image.

* * * * *